Figure 1:
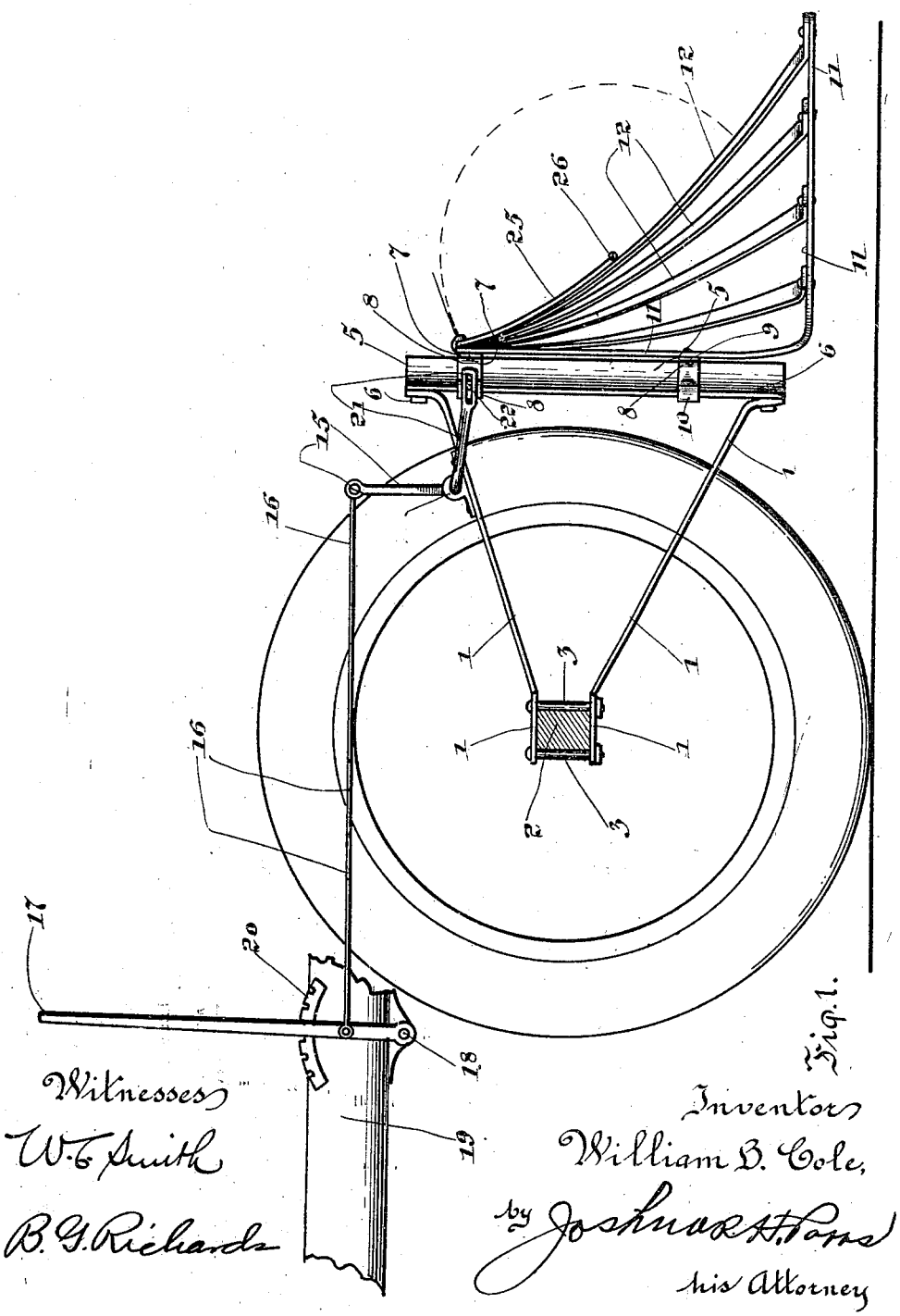

W. B. COLE.
AUTOMOBILE FENDER.
APPLICATION FILED JUNE 16, 1911.

1,009,224.

Patented Nov. 21, 1911.
2 SHEETS—SHEET 1.

Witnesses
W. T. Smith
B. G. Richards

Inventor
William B. Cole,
by Joshua R. H. Potts
his Attorney

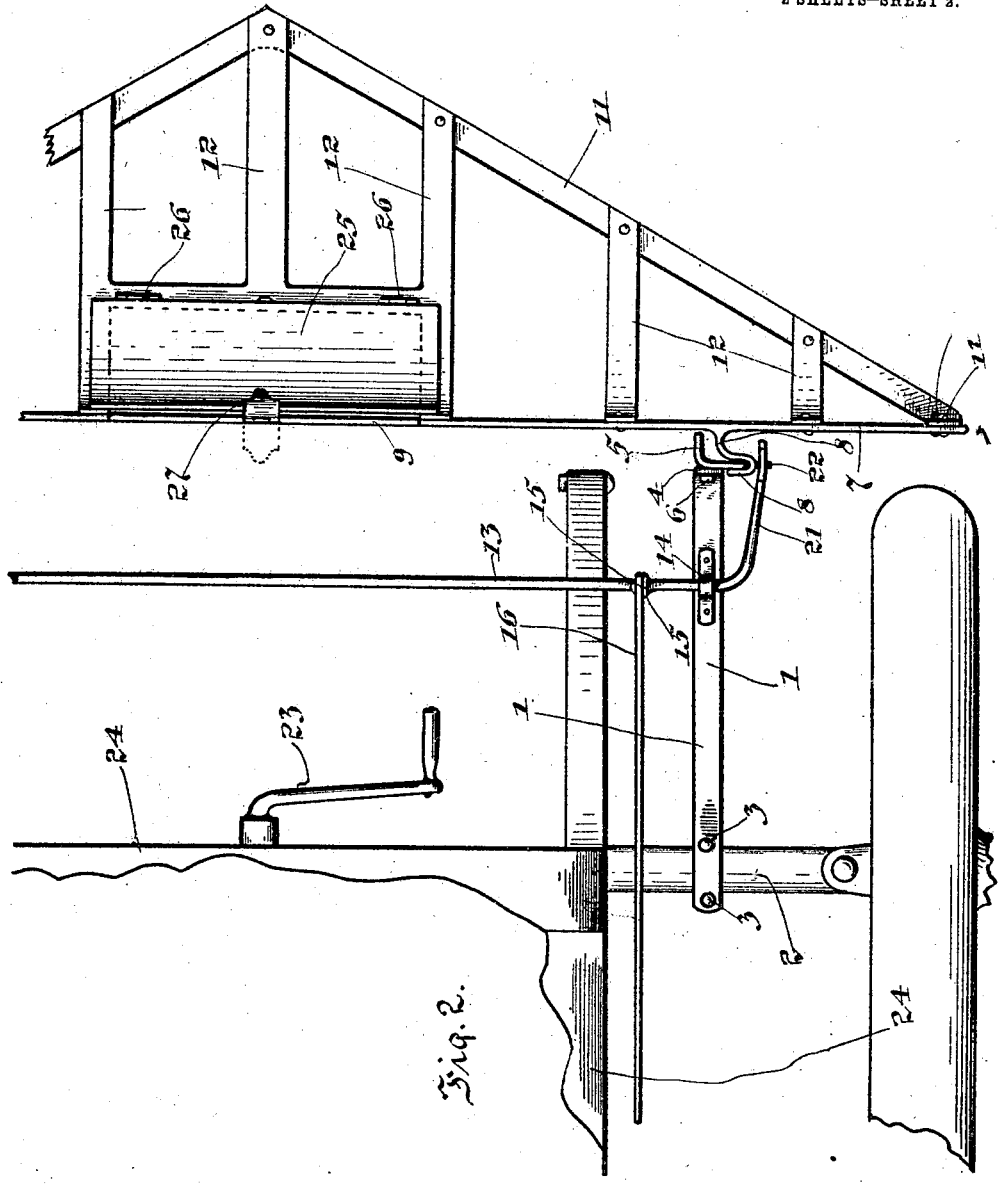

UNITED STATES PATENT OFFICE.

WILLIAM B. COLE, OF CHICAGO, ILLINOIS, ASSIGNOR OF ONE-HALF TO ERNEST M. WARFFUEL, OF CHICAGO, ILLINOIS.

AUTOMOBILE-FENDER.

1,009,224.

Specification of Letters Patent. Patented Nov. 21, 1911.

Application filed June 16, 1911. Serial No. 633,500.

*To all whom it may concern:*

Be it known that I, WILLIAM B. COLE, a citizen of the United States, and a resident of the city of Chicago, county of Cook, and State of Illinois, have invented certain new and useful Improvements in Automobile-Fenders, of which the following is a specification.

My invention relates to improvements in fenders especially designed for automobiles, the object being to provide a fender which shall be symmetrical of design and efficient in operation.

The invention consists in the combination and arrangement of parts hereinafter described and claimed.

My invention will be best understood by reference to the accompanying drawings forming a part of this specification, and in which, Figure 1 is a sectional elevation of a portion of an automobile embodying my invention, and Fig. 2 is a top plan view showing the general arrangement of the fender.

The preferred form of construction as illustrated in the accompanying drawings comprises two pairs of forwardly extending diverging arms 1 which are secured to the front axle 2 of the automobile by means of bolts 3. Only one pair of arms 1 are shown in the plan view but since the design is symmetrical the arrangement of the pair not shown is obvious. The arms 1 are disposed in the same vertical plane and are provided with out-turned portions 4 at their forward ends to which is attached a vertically disposed angle iron 5 by means of bolts 6, this construction being clear by reference to Fig. 2. One web of the angle iron 5 extends laterally and the other forwardly in order to properly receive the fender proper which is vertically slidable thereon.

The fender proper consists in a transversely extending bar 7 the length of which is approximately equal to the tread of the machine. Extending rearwardly from the bar 7 is a pair of U-shaped lugs 8 which embrace the outwardly extending web of the angle irons 5 as illustrated in Fig. 2. The connection thus formed is such that the bar 7 may move freely vertically on the guide angle iron 5. The bar 7 is normally disposed adjacent the top on the angle iron 5, and arranged directly below the bar 7 is a similar bar 9 having rearwardly extending lugs 10 similar to the lugs 8 provided on the bar 7. The bars 7 and 9 are secured relative to each other by means of a vertically extending member 11 which is riveted to said bars as indicated in Fig. 1. The member 11 extends below the bar 9 and is bent forwardly and inclined toward the center of the machine. From the center line of the machine the member 11 is bent rearwardly and upwardly so as to connect with the other end of bar 7. Connecting the inclined horizontal portions of the member 11 and the transversely extending bar 7 is a plurality of rearwardly and upwardly extending curved plates 12 the same being spaced apart as shown in Fig. 2. The ends of the plates 12 are securely riveted to the member 11 and bar 7 and the resulting structure is very rigid and strong.

From the construction thus far described it is apparent that the fender proper is free to move vertically on the guide angle irons 5 and may be removed therefrom if desired. In order to hold the fender in proper position relative to the guide angle irons 5 a transversely extending rod 13 is journaled to the members 1 by means of bearings 14. Extending upwardly from the rod 13 is an operating arm 15 which is arranged adjacent one of the bearings 14 as illustrated in Fig. 2. Pivoted to the arm 15 at the upper extremity thereof is a longitudinally extending connecting rod 16 which extends rearwardly to an operating lever 17 which is pivoted as at 18 to the frame 19 of the machine. The operating lever 17 may be provided with the usual quadrant 20 if desired, the function of the latter being to hold said lever in any angular position. Extending forwardly from each end of the rod 13 are arms 21 which are slotted at their forward extremities to receive laterally extending pins 22 provided on the lugs 8. Only one of the arms 21 is shown in Fig. 2 but it is clear that the other arm is similar in construction to the one shown.

In order that a person may start the motor of the automobile by turning the crank 23 which extends forwardly from the body 24 of the machine a door 25 is provided in the fender which is hinged as at 26 to turn downwardly as indicated by dotted lines in Fig. 1. In this manner the crank 23 is rendered accessible. In order to avoid obstruction of the opening of the door 25 the bar 7 is cut away at this point. The door 25 when closed is automatically locked by a suitable snap 27. The plates 12 which connect the members 11 with the bar 7 are somewhat modified in the center of the fender on account of the door 25, the change of construction being evident by reference to Fig. 2.

In use the fender is normally in an elevated position, and when it is desired to lower the same into close proximity to the road surface it is only necessary to move the operating lever 17 forwardly whereupon the fender will drop a corresponding distance. It is clear that when the lever 17 is locked in any position by means of the quadrant 20 that the fender will likewise be locked on the guide members 5. In case a person comes in contact with the fender he will be thrown upwardly and to one side without necessarily receiving any injury, the general contour of this fender being similar to that of a locomotive pilot which has been proven to be the best design for a fender in a fast moving vehicle.

The advantage of this fender over that of a locomotive pilot is that the same may be moved to any desired vertical position at the will of the operator to suit the varying road conditions.

An automobile fender of the construction set forth is symmetrical in design, compact and neat in appearance, and highly efficient in operation.

While I have illustrated and described the preferred form of construction for carrying my invention into effect, this is capable of variation and modification without departing from the spirit of the invention. I therefore do not wish to be limited to the precise details of construction set forth, but desire to avail myself of such variations and modifications as come within the scope of the appended claims.

Having described my invention what I claim as new and desire to secure by Letters Patent is:

1. In an automobile, a pair of vertically disposed guide angle irons mounted at the front of said automobile, the webs of said angle irons extending outwardly and forwardly, a pair of transversely extending bars having U-shaped lugs embracing said outwardly extending webs of said angle irons, and a fender mounted on said bars, substantially as described.

2. In an automobile a pair of forwardly extending diverging arms provided adjacent each end of the automobile front axle, a vertically disposed guide angle iron secured to each pair of arms at their forward extremities, the webs of the angle irons extending outwardly and forwardly, a pair of transversely extending bars having U-shaped lugs embracing said outwardly extending webs of said angle irons, a member connecting said bars and extending forwardly therefrom, a series of plates connecting said last-named member with said transversely extending bars, and means pivoted to said lugs for moving the same vertically on said guide members, substantially as described.

3. In an automobile, a pair of forwardly extending diverging arms secured to the automobile front axle adjacent each end thereof, the arms of each pair being disposed in the same vertical plane and the forward extremities of each arm being turned outwardly, a vertically disposed angle iron secured to the outwardly turned ends of each pair of arms, the webs of each angle iron being disposed forwardly and outwardly, a pair of transversely disposed bars the lengths of which are substantially coextensive with the width of the automobile, said bars being provided with rearwardly extending U-shaped lugs which loosely embrace the outwardly extending webs of said guide members so as to slide freely thereon, members connecting said transversely extending bars and extending forwardly therefrom, and means for moving said bars and lugs vertically, substantially as described.

4. In an automobile, a pair of forwardly extending diverging arms arranged adjacent each end of the automobile axle, the arms of each pair being disposed in the same vertical plane and provided with outwardly turned ends, a vertically disposed angle iron bolted to the outwardly turned ends of each pair of arms, the plane in which said angle irons lie being somewhat ahead of the automobile front wheels, a pair of transversely extending bars having rearwardly extending U-shaped lugs loosely engaging said guide members, means for connecting said bars to form a fender proper, a transversely extending rod journaled to the uppermost of said forwardly extending arms and provided with forwardly extending arms having slotted extremities, a pair of pins projecting from a pair of said U-shaped lugs and engaging the slots of said slotted arms, and means for oscillating said transversely extending rod, substantially as described.

5. In an automobile, a fender comprising a pair of forwardly extending diverging arms secured adjacent the extremities of the forward automobile axle, the arms of each pair being disposed in the same vertical plane and provided with bent portions at their forward extremities, a vertically disposed angle iron bolted to said bent portions of each pair of arms, the disposition of each angle iron being in a vertical plane slightly ahead of the automobile front wheels, the webs of the angle irons being disposed forwardly and outwardly, a pair of transversely disposed bars the length of which is approximately equal to the width of the automobile, rearwardly extending U-shaped lugs provided on each bar, said lugs loosely engaging the outwardly extending webs of the guide members so as to move freely thereon, a member connecting said transversely extending bars at the extremities thereof and inclined forwardly to the center line of the machine, a plurality of plates connecting said last-named member with said transversely extending bars and curved downwardly and forwardly from the latter, a door centrally positioned on said plates and adapted to turn downwardly to provide access to the automobile engine crank, and means for elevating and lowering said lugs and the parts rigidly secured thereto, substantially as described.

6. In an automobile, a pair of arms extending forwardly from either end of the automobile front axle, a vertically disposed guide angle iron secured to the forward extremities of each pair of arms, a fender provided with lugs adapted to slide freely on said guide members, and means for moving said fender comprising a transversely extending rod journaled to said forwardly extending arms, a pair of arms having slotted extremities formed integral with each end of said rod, there being pins formed integral with said lugs for engaging the slots of said arms, an upwardly extending operating arm formed integral with said transversely extending rod, a connecting rod extending rearwardly from the upper end of said operating arm and pivoted thereto, an operating lever pivoted to the rear extremity of said connecting rod and to the automobile frame, and a quadrant arranged in operative relation with said operating lever, substantially as described.

In testimony whereof I have signed my name to this specification in the presence of two subscribing witnesses.

WILLIAM B. COLE.

Witnesses:
  HELEN F. LILLIS,
  JOSHUA R. H. POTTS.